US012686762B2

(12) United States Patent
Abe

(10) Patent No.: US 12,686,762 B2
(45) Date of Patent: Jul. 21, 2026

(54) NITRILE RUBBER-BASED COMPOSITION

(71) Applicant: NOK CORPORATION, Tokyo (JP)

(72) Inventor: Shunsuke Abe, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 628 days.

(21) Appl. No.: 18/036,962

(22) PCT Filed: Nov. 4, 2021

(86) PCT No.: PCT/JP2021/040537
§ 371 (c)(1),
(2) Date: May 15, 2023

(87) PCT Pub. No.: WO2022/102499
PCT Pub. Date: May 19, 2022

(65) Prior Publication Data
US 2023/0416506 A1 Dec. 28, 2023

(30) Foreign Application Priority Data

Nov. 16, 2020 (JP) ................................. 2020-190230

(51) Int. Cl.
| | |
|---|---|
| *H01F 1/117* | (2006.01) |
| *C08K 3/08* | (2006.01) |
| *C08K 5/5419* | (2006.01) |
| *C08K 9/06* | (2006.01) |
| *C08L 9/02* | (2006.01) |

(52) U.S. Cl.
CPC ..................................... *C08L 9/02* (2013.01); *C08K 3/08* (2013.01); *C08K 5/5419* (2013.01); *C08K 9/06* (2013.01); *H01F 1/117* (2013.01); *C08K 2003/0856* (2013.01); *C08K 2201/005* (2013.01); *C08K 2201/01* (2013.01)

(58) Field of Classification Search
CPC ........ H01F 1/083; H01F 1/113; H01F 1/0558; H01F 1/117; H01F 1/14741–14758; H01F 1/24–26; H01F 1/37–375
See application file for complete search history.

(56) References Cited

U.S. PATENT DOCUMENTS

| | | | |
|---|---|---|---|
| 2005/0004286 A1* | 1/2005 | Yamaguchi | G01D 5/244 |
| | | | 524/431 |
| 2006/0186369 A1* | 8/2006 | Kasamoto | H01F 1/117 |
| | | | 254/261 |
| 2010/0286348 A1 | 11/2010 | Pan et al. | |
| 2015/0141582 A1 | 5/2015 | Yan et al. | |
| 2015/0371744 A1 | 12/2015 | Yamoto et al. | |
| 2019/0233557 A1 | 8/2019 | Pan et al. | |
| 2019/0322777 A1 | 10/2019 | Pan et al. | |

FOREIGN PATENT DOCUMENTS

| | | | |
|---|---|---|---|
| EP | 2 231 719 B1 | 7/2015 | |
| JP | 53-64797 A | 6/1978 | |
| JP | 60-107731 A | 6/1985 | |
| JP | 2005-154676 A | 6/2005 | |
| JP | 2005-268484 A | 9/2005 | |
| JP | 2006-66828 A | 3/2006 | |
| JP | 2010263201 | * | 11/2010 |
| KR | 2017-0051571 A | 5/2017 | |
| WO | 2014/129309 A1 | 8/2014 | |

OTHER PUBLICATIONS

International Preliminary Report on Patentability issued in International Pat. Appl. No. PCT/JP2021/040537, dated May 16, 2023, along with an English translation thereof.
International Search Report and Written Opinion of the International Searching Authority issued in International Pat. Appl. No. PCT/JP2021/040537, dated Dec. 21, 2021, along with an English translation thereof.

* cited by examiner

*Primary Examiner* — Matthew E. Hoban
(74) *Attorney, Agent, or Firm* — Greenblum & Bernstein, P.L.C.

(57) ABSTRACT

A nitrile rubber-based composition comprising 1,000 to 2,500 parts by weight of a magnetic powder or silylated magnetic powder having a compressed density of 3.4 to 3.7 $g/cm^3$, 0.5 to 20 parts by weight of alkoxyalkylsilane, and 8 to 40 parts by weight of a plasticizer, based on 100 parts by weight of nitrile rubber, hydrogenated nitrile rubber, or blend rubber thereof. The nitrile rubber-based composition that does not cause deterioration in roll processability and in adhesion between an adhesive applied to a metal plate and the rubber, even when a magnetic powder is added at a ratio as high as 1,000 parts by weight or more based on 100 parts by weight of nitrile rubber, hydrogenated nitrile rubber, or blend rubber thereof.

13 Claims, No Drawings

NITRILE RUBBER-BASED COMPOSITION

TECHNICAL FIELD

The present invention relates to a nitrile rubber-based composition, and more particularly to a nitrile rubber-based composition, in which magnetic powder is added to rubber components.

BACKGROUND ART

Conventionally, rubber magnets for sensor have been used in magnetic encoder rings used in encoder parts for wheel speed sensors of automobiles. The magnetic force is the most important characteristic of such rubber magnets for sensor. In recent years, there has been an increasing demand for rubber magnets as automobile parts to have a high magnetic force.

Since the magnetic force is almost proportional to the amount of magnetic powder compounded with a rubber compound, in order to increase the magnetic force, it is necessary to increase the compounding amount of magnetic powder. Patent Document 1 discloses a nitrile rubber-based composition compounded with a magnetic powder having an average particle size of 1.00 to 1.50 m and a compressed density of 3.30 to 3.55 $g/cm^3$ when compressed at a pressure of 1 $ton/cm^2$.

The present applicant has previously proposed a nitrile rubber-based composition obtained by selecting a highly fillable magnetic powder in consideration of the processability of rubber and the rubber flexibility of the vulcanizate itself, and compounding a large amount of the magnetic powder; specifically a nitrile rubber-based composition comprising 1,000 to 1,200 parts by weight of a magnetic powder having a compressed density of 3.4 to 3.7 $g/cm^3$ based on 100 parts by weight of nitrile rubber, hydrogenated nitrile rubber, or blend rubber thereof, the rubber having a Mooney viscosity $ML_{1+4}$ (100° C.) of 20 to 50 (Patent Document 2).

However, as shown in Comparative Example 2 provided later, when the compounding amount of magnetic powder based on 100 parts by weight of rubber exceeds 1,200 parts by weight, even if a low viscosity millable type polymer is used, there are problems that as the polymer ratio decreases, processability deteriorates due to the increase in the viscosity of the rubber compound, the hardness of the molded product increases, flexibility, which is an advantage of rubber magnets, is lost, and the adhesion is reduced.

PRIOR ART DOCUMENT

Patent Document

Patent Document 1: JP-A-53-64797
Patent Document 2: WO 2014/129309 A1

OUTLINE OF THE INVENTION

Problem to be Solved by the Invention

An object of the present invention is to provide a nitrile rubber-based composition that does not cause deterioration in roll processability and in adhesion between an adhesive applied to a metal plate and the rubber, even when a magnetic powder is added at a ratio as high as 1,000 parts by weight or more based on 100 parts by weight of nitrile rubber, hydrogenated nitrile rubber, or blend rubber thereof.

Means for Solving the Problem

The above object of the present invention can be achieved by a nitrile rubber-based composition comprising 1,000 to 2,500 parts by weight of a magnetic powder or silylated magnetic powder having a compressed density of 3.4 to 3.7 $g/cm^3$, 0.5 to 20 parts by weight of alkoxyalkylsilane, and 8 to 40 parts by weight of a plasticizer, based on 100 parts by weight of nitrile rubber, hydrogenated nitrile rubber, or blend rubber thereof.

Effect of the Invention

The nitrile rubber-based composition according to the present invention has the following excellent effects. That is, by adding a magnetic powder or silylated magnetic powder having a high compressed density, alkoxyalkylsilane, and a plasticizer to nitrile rubber and/or hydrogenated nitrile rubber, even when a large amount of the magnetic powder is compounded, processability can be improved while keeping the viscosity of the rubber compound low. In addition, the resulting molded product can maintain its flexibility while retaining the original high magnetic force of the highly compounded magnetic powder without impairing the adhesion between the adhesive applied to the metal plate and the rubber, and the original physical properties of the rubber.

EMBODIMENTS FOR CARRYING OUT THE INVENTION

As the nitrile rubber, nitrile rubber, hydrogenated nitrile rubber, or blend rubber thereof is used. Commercial products, such as DN219 produced by JSR Corporation and Zetpol 2020L produced by Zeon Corporation, can be used as they are. The nitrile rubber used is preferably millable type one itself or a blend thereof having a Mooney viscosity $ML_{1+4}$ (100° C.) of 20 to 50. When nitrile rubber having such a Mooney viscosity is used, the viscosity of the rubber compound does not get higher, ensuring workability during roll processing and maintaining the fluidity of the rubber compound; thus, vulcanization moldability is not impaired, and adhesion is suppressed during roll processing, which tends to facilitate continuous winding. Millable type as mentioned herein is one that can be plasticized or mixed by a kneader, such as a roll, unlike liquid type one that is in a liquid or paste state before vulcanization.

As the magnetic powder, one having a compressed density, as measured by a method described later, of 3.4 to 3.7 $g/cm^3$, preferably 3.5 to 3.6 $g/cm^3$, or one having a surface silylated with alkoxyalkylsilane in advance, is used. Examples of such magnetic powder include those preferably having a particle size distribution with two peaks at particle sizes of 1 to 2 μm and 2 to 4 μm, those obtained by blending magnetic powders having particle sizes of 1 to 2 m and 2 to 4 μm, and the like. Commercial products, such as SF-D630 and SF-H470 produced by DOWA F-Tec Co., Ltd., can be used as they are. The particle size distribution peaks as mentioned herein indicate both a part having two downward sides and a part having one downward side in a graph of particle size distribution in which the horizontal axis represents particle size and the vertical axis represents the proportion of particles of each size. When a silylated magnetic powder whose surface has been treated with alkoxyalkylsilane in advance is used, the amount of surface treated alkoxyalkylsilane is included in the amount of alkoxyalkylsilane.

As the type of magnetic powder, at least one of ferrite magnets and rare-earth magnets is generally used; however, ferrite magnets are preferably used because of their low cost and good adhesion to rubber, although their magnetic force is lower than that of rare-earth magnets. In terms of magnetic force, strontium ferrite $SrO \cdot 6Fe_2O_3$ or barium ferrite $BaO \cdot 6Fe_2O_3$ is more preferably used. Such magnetic powders preferably have a residual magnetic flux density Br of 1,600 (G) or more and a coercive force iHc of 3,000 (Oe) or more, which are magnetic properties of a compressed powder measured in the following manner: A sample is prepared by adding 1.5 ml of 5 wt. % PVA aqueous solution to 20 g of magnetic powder, and placing the mixture in a cylindrical mold (diameter: 25.4 mm), followed by pressure molding at a pressure of 1 ton/cm² (98 MPa). The Br and iHc of the sample are measured by a DC magnetization measuring device.

Such a magnetic powder is used at a ratio of 1,000 parts by weight or more, preferably 1,000 to 2,500 parts by weight, based on 100 parts by weight of nitrile rubber, hydrogenated nitrile rubber, or blend rubber thereof. When the ratio of magnetic powder used is greater than this range, the viscosity of the rubber compound gets higher, reducing the fluidity of the compound. Thus, the processability of the rubber compound by a roll and vulcanizing and molding properties become difficult.

Examples of alkoxyalkylsilane include trimethoxymethylsilane, triethoxymethylsilane, dimethoxydimethylsilane, diethoxydimethylsilane, dimethoxymethylsilane, diethoxymethylsilane, methoxytrimethylsilane, trimethoxypropylsilane, triethoxypropylsilane, triethoxyoctylsilane, trimethoxyoctylsilane, and the like. Preferably, trialkoxyoctylsilane, such as triethoxyoctylsilane or trimethoxyoctylsilane, is used. If a silane coupling agent other than alkoxyalkylsilane, such as a mercapto-based or sulfur-based silane coupling agent, is used, moldability deteriorates, and adhesion to the metal plate cannot be ensured. Further, if a silane coupling agent having a functional group is used, moldability deteriorates.

Alkoxyalkylsilane is used at a ratio of about 0.5 to 20 parts by weight based on 100 parts by weight of nitrile rubber, hydrogenated nitrile rubber, or blend rubber thereof. Specifically, the optimal amount of alkoxyalkylsilane to be added varies depending on the amount of magnetic powder used. Alkoxyalkylsilane is used at a ratio of about 0.5 to 1.0 part by weight based on 1,000 parts by weight to less than 1,300 parts by weight of the magnetic powder, about 1.0 to 2.0 parts by weight based on 1,300 parts by weight to less than 1,700 parts by weight of the magnetic powder, about 2.0 to 10 parts by weight based on 1,700 parts by weight to less than 2,000 parts by weight of the magnetic powder, and about 10 to 20 parts by weight based on 2,000 to 2,500 parts by weight of the magnetic powder. If alkoxyalkylsilane is used at a ratio less than this range, the Mooney viscosity Vm increases, and kneadability and moldability cannot be ensured. In contrast, if alkoxyalkylsilane is used at a ratio greater than this range, the adhesion to the metal plate deteriorates.

Compounding alkoxyalkylsilane increases the adhesion between the rubber polymer and the magnetic powder, and leads to an increase in the adhesion between the adhesive applied to the metal plate during vulcanization bonding and the rubber. Further, since the dispersibility of the magnetic powder itself is enhanced, effects are exhibited such as being able to reduce the viscosity of the composition compound, and improving roll processability (roll winding properties) during kneading.

Examples of usable plasticizers include phthalic acid esters, such as dioctyl phthalate, diisononyl phthalate, and diundecyl phthalate; 1,2-dicyclohexane dicarboxylic acid ester compounds, such as 1,2-cyclohexane dicarboxylic acid diisononyl ester; adipic acid esters, such as dioctyl adipate and diisononyl adipate; castor oil-based esters, such as methyl acetyl ricinoleate, butyl acetyl ricinoleate, acetylated ricinoleic acid triglyceride, and acetylated polyricinoleic acid triglyceride; trimellitic acid esters, such as trioctyl trimellitate and triisononyl trimellitate; pyromellitic acid esters, such as tetraoctyl pyromellitate and tetraisononyl pyromellitate; phosphoric acid esters, such as tricresyl phosphate, trixylenyl phosphate, cresyl diphenyl phosphate, xylenyl phosphate, and triphenyl phosphate; and the like. Preferably, triisononyl trimellitate is used.

The plasticizer is used at a ratio of about 8 to 40 parts by weight, preferably about 16 to 40 parts by weight, based on 100 parts by weight of nitrile rubber, hydrogenated nitrile rubber, or blend rubber thereof. If the plasticizer is used at a ratio less than this range, the viscosity of the composition increases, and kneadability and moldability cannot be ensured. In contrast, if the plasticizer is used at a ratio greater than this range, the normal state physical properties and the adhesion to the metal plate deteriorate.

The above nitrile rubber-based composition is compounded with a vulcanizing agent, such as sulfur or a sulfur-providing compound (e.g., tetramethylthiuram monosulfide or tetramethylthiuram disulfide), or organic peroxide, and optionally further as needed with a reinforcing agent or a filler, such as carbon black or silica, an antioxidant, a processing aid, a vulcanization accelerator, etc., and kneaded using an open roll, kneader or the like. The kneaded product is vulcanized and molded at about 150 to 200° C. for about 1 to 30 minutes by a vulcanization means, such as a heat press, preferably in a mold to which a magnetic field is applied.

The vulcanization-molded product composed of the nitrile rubber-based composition is applied as, for example, a rubber magnet for sensor used in magnetic encoders. A commercially available phenol resin, epoxy resin, or the like is used as an adhesive bonding a rubber magnet for sensor and an encoder metal ring. Stainless steel plate, a cold rolling steel plate, or the like is used as the metal.

The produced encoder comprises an annular magnetic rubber molded product mounted on a support member capable of being attached to a rotating body. It is preferable that any number of N pole and S pole are magnetized in the circumferential direction.

EXAMPLES

The following describes the present invention with reference to Examples.

Example 1

| Nitrile rubber (DN219, produced by JSR; Mooney viscosity $ML_{1+4}$ (100° C.): 27) | 70 parts by weight |
|---|---|
| Hydrogenated nitrile rubber (Zetpol 2020L, produced by Zeon Corporation; Mooney viscosity $ML_{1+4}$ (100° C.): 57.5) | 30 parts by weight |

5

-continued

| | |
|---|---|
| Strontium ferrite magnetic powder (SF-D630, produced by Dowa F-Tec Co., Ltd.; compressed density: 3.59 g/cm³; particle size distribution peaks: 1.7 μm and 3.3 μm) | 1,000 parts by weight |
| Active zinc oxide (produced by Seido Chemical Industry Co., Ltd.) | 3 parts by weight |
| Fatty acid amide (Diamide O-200, produced by Nippon Kasei Chemical Co., Ltd.) | 2 parts by weight |
| Antioxidant (Nocrac CD, produced by Ouchi Shinko Chemical Industrial Co., Ltd.; 4,4'-bis(α,α-dimethylbenzyl)diphenyl amine) | 2 parts by weight |
| Antioxidant (Nocrac MBZ, produced by Ouchi Shinko Chemical Industrial Co., Ltd.; zinc salt of 2-mercaptobezimidazole) | 0.5 parts by weight |
| Stearic acid (produced by Miyoshi Oil & Fat Co., Ltd.) | 2 parts by weight |
| Paraffin wax (produced by Nippon Seiro Co., Ltd.) | 2 parts by weight |
| Sulfur (produced by Tsurumi Chemical Industry Co., Ltd.) | 2 parts by weight |
| Tetramethylthiuram disulfide (Nocceler TT, produced by Ouchi Shinko Chemical Industrial Co., Ltd.) | 2 parts by weight |
| N-cyclohexyl-2-benzothiazyl sulfenamide; (Nocceler CZ, produced by Ouchi Shinko Chemical Industrial Co., Ltd.) | 1 part by weight |
| Plasticizer (C-9N, produced by ADEKA Corporation) | 8 parts by weight |
| Alkoxyalkylsilane (OCTEO produced by Evonik Industries) | 0.5 parts by weight |

The above components were kneaded by a closed type kneader (pressurizing type kneader) and an open roll, and the kneaded product was compression-molded at 180° C. for 4 minutes, thereby vulcanization-molding a two mm thick test rubber sheet.

The compressed density (CD value) of the magnetic powder was calculated in such a manner that 10 g of the magnetic powder sample was placed in a cylindrical mold having a diameter of 25.4 mm, and compressed by a press at an effective pressure of 1,000 kgf/cm² (98 MPa), and the compressed density was calculated from the measured value of the sample thickness (h) after compression using the following formula:

$$CD \ (g/cm^3)=10/\pi \times (1.27)^2 \times h$$

Using the kneaded product and test rubber sheet, the following evaluations and measurements were each carried out.

Compound processability: A rubber composition that could be fed as a sheet after it was wound around a roll, followed by addition kneading was evaluated as ○, and a rubber composition that could not be fed as a sheet was evaluated as X.

TP moldability: A test rubber sheet that could be released smoothly from the mold without sticking to the mold or damaging the rubber itself was evaluated as ○, and a test rubber sheet that was difficult to release from the mold was evaluated as X.

Adhesion: A kneaded sheet compound was vulcanized and bonded to a SUS plate coated with a phenolic adhesive, and the adhesion state when this was peeled using pincers was observed. A rubber remaining ratio of 70% or more was evaluated as ○, and less than 70% as X.

Compound fluidity: According to JIS K6300-1: 2001 corresponding to ISO 289-1: 1994 and 289-2: 1994, the minimum Mooney viscosity Vm was measured under a temperature condition of 125° C. using a Mooney viscometer (AM-3, produced by Toyo Seiki Seisaku-sho, Ltd.). A Vm of 80% or more was evaluated as ○, and less than 80% as X.

Normal state physical properties (hardness): According to JIS K6253: 1997 corresponding to ISO 7619: 1997, the instant hardness Hs was measured using a type A durometer.

Normal state physical properties (tensile strength, elongation): According to JIS K6251: 2010 corresponding to ISO 37, the tensile strength (MPa) and elongation at break (%) were measured.

Magnetic force: The magnetic force of a sample with a thickness of 2 mm, a length of 3 mm, and a width of 5 mm was measured using a vibrating sample magnetometer (VSM-5, produced by Toei Industry Co., Ltd.) under the conditions of an applied magnetic field of $1.5 \times 10^4$ Oe and a frequency of 80 Hz, and the saturation magnetization Ms (unit: mT), residual magnetization Mr (unit: mT), and coercive force iHc (unit: kA/m) were determined from the magnetic force curve.

Comparative Example 1

In Example 1, alkoxyalkylsilane was not used.

Comparative Example 2

When the amount of magnetic powder was changed to 2,000 parts by weight in Comparative Example 1, kneading and molding could not be performed.

Comparative Example 3

When the plasticizer was not used in Example 1, the resultant became sandy during kneader kneading, and molding could not be performed.

Example 2

In Example 1, the amount of magnetic powder was changed to 2,000 parts by weight, the amount of alkoxyalkylsilane was changed to 5 parts by weight and the amount of plasticizer was changed to 40 parts by weight, respectively.

Comparative Example 4

In Example 2, the amount of alkoxyalkylsilane was changed to 12.5 parts by weight and the amount of plasticizer was changed to 60 parts by weight, respectively.

Comparative Example 5

In Example 2, the amount of plasticizer was changed to 80 parts by weight.

Comparative Example 6

In Comparative Example 5, the amount of alkoxyalkylsilane was changed to 20 parts by weight.

Comparative Example 7

When the amount of plasticizer was changed to 16 parts by weight in Example 2, kneading and molding could not be performed.

Example 3

In Example 1, the amount of magnetic powder was changed to 2,000 parts by weight, the amount of alkoxyalkylsilane was changed to 10 parts by weight and the amount of plasticizer was changed to 30 parts by weight, respectively.

Comparative Example 8

In Example 3, the amount of alkoxyalkylsilane was changed to 30 parts by weight.

Comparative Example 9

In Example 3, the same amount (10 part by weight) of mercapto-based silane coupling agent was used in place of alkoxyalkylsilane.

Comparative Example 10

In Example 3, the same amount (10 part by weight) of sulfur-based silane coupling agent was used in place of alkoxyalkylsilane.

Example 4

In Example 1, the amount of magnetic powder was changed to 2,500 parts by weight, the amount of alkoxyalkylsilane was changed to 20 parts by weight and the amount of plasticizer was changed to 40 parts by weight, respectively.

Comparative Example 11

When the amount of alkoxyalkylsilane was changed to 5 parts by weight in Example 4, molding could not be performed.

Comparative Example 12

When the amount of magnetic powder was changed to 3,000 parts by weight, the amount of alkoxyalkylsilane was changed to 30 parts by weight, and the amount of plasticizer was changed to 50 parts by weight, respectively in Example 1, kneading and molding could not be performed.

Results of evaluations and measurements obtained in the foregoing Examples and Comparative Examples are given in the following Table.

The above results demonstrate the following.
(1) In Examples 1 to 4, the compound processability, moldability, adhesion to the metal plate, and compound fluidity are all excellent. Since a large amount of magnetic powder is compounded, molded products having a high magnetic force can be produced.
(2) When alkoxyalkylsilane is not used, the adhesion to the metal plate is reduced (Comparative Example 1), or in the first place, kneading and molding cannot be performed (Comparative Example 2).
(3) When a plasticizer is not used, molding cannot be performed (Comparative Example 3).
(4) When a prescribed amount or more of alkoxyalkylsilane is used, the adhesion to the metal plate is reduced (Comparative Example 8).
(5) When an insufficient amount of alkoxyalkylsilane is compounded based on the amount of magnetic powder, kneading and molding cannot be performed (Comparative Example 7). Even if the amount of plasticizer is increased to allow kneading, molding cannot be performed, and the adhesion to the metal plate is reduced (Comparative Example 11).
(6) When a silane coupling agent other than alkoxyalkylsilane is used, moldability deteriorates, and adhesion to the metal plate cannot be ensured (Comparative Examples 9 and 10).
(7) If the amount of plasticizer is too large, the adhesion to the metal plate is reduced (Comparative Examples 4 to 6).

INDUSTRIAL APPLICABILITY

The nitrile rubber-based composition according to the present invention can be effectively used as a vulcanization molding material of rubber magnet for sensor and the like applied to magnetic encoders for wheel speed sensors etc.

The invention claimed is:
1. A nitrile rubber-based composition comprising 2,000 to 2,500 parts by weight of a magnetic powder or silylated magnetic powder having a compressed density of 3.4 to 3.7 g/cm$^3$, 10 to 20 parts by weight of alkoxyalkylsilane, and & 30 to 40 parts by weight of a plasticizer, based on 100 parts by weight of nitrile rubber, hydrogenated nitrile rubber, or blend rubber thereof.

TABLE

| Measurement item | | Ex. 1 | Comp. Ex. 1 | Ex. 2 | Comp. Ex. 4 | Comp. Ex. 5 | Comp. Ex. 6 | Ex. 3 | Comp. Ex. 8 | Comp. Ex. 9 | Comp. Ex. 10 | Ex. 4 | Comp. Ex. 11 |
|---|---|---|---|---|---|---|---|---|---|---|---|---|---|
| [Before vulcanization] Compound processability kneadability evaluation | | ○ | ○ | ○ | ○ | ○ | ○ | ○ | ○ | ○ | ○ | ○ | ○ |
| [After vulcanization] Moldability Tp moldability evaluation | | ○ | ○ | ○ | ○ | ○ | ○ | ○ | ○ | X | X | ○ | X |
| Adhesion Rubber remaining ratio | (%) | 80 | 60 | 90 | 10 | 10 | 50 | 90 | 40 | 60 | 60 | 70 | 50 |
| Evaluation | | ○ | X | ○ | X | X | X | ○ | X | X | X | ○ | X |
| Compound fluidity Mooney viscosity Vm | | 107.8 | 117 | 94.8 | 44.5 | 43.2 | 30.6 | 93.7 | 50 | — | — | 179.6 | — |
| Normal state physical properties Hardness (Duro A, peak) | | 89 | 90 | 93 | 82 | 74 | 61 | 91 | 84 | — | — | 92 | — |
| Tensile strength | (MPa) | 2.6 | 2.5 | 3.7 | 1.1 | 0.95 | 0.34 | 1.5 | 1.2 | — | — | 3.9 | — |
| Elongation (%) | | 200 | 180 | 6 | 30 | 30 | 30 | 90 | 40 | — | — | 3 | — |
| Magnetic force Saturation magnetization Ms | (mT) | 248 | 253 | 293 | 292 | 282 | 285 | 295 | 290 | — | — | 299 | — |
| Residual magnetization Mr | (mT) | 201 | 205 | 242 | 240 | 229 | 234 | 238 | 236 | — | — | 245 | — |
| Coercive force iHc | (kA/m) | 141 | 143 | 126 | 146 | 154 | 128 | 129 | 119 | — | — | 122 | — |

2. The nitrile rubber-based composition according to claim 1, wherein the alkoxyalkylsilane is used at a ratio of 10 to 20 parts by weight based on the 2,000 to 2,500 parts by weight of the magnetic powder.

3. The nitrile rubber-based composition according to claim 1, wherein millable type nitrile rubber having a Mooney viscosity $ML_{1+4}$ (100° C.) of 20 to 50 is used.

4. The nitrile rubber-based composition according to claim 1, wherein a magnetic powder having two particle size distribution peaks at 1 to 2 μm and 2 to 4 μm is used.

5. The nitrile rubber-based composition according to claim 1, wherein the magnetic powder having a compressed density of 3.4 to 3.7 $g/cm^3$ is at least one of a ferrite magnet and a rare-earth magnet.

6. The nitrile rubber-based composition according to claim 5, wherein the ferrite magnet is a strontium ferrite or a barium ferrite.

7. The nitrile rubber-based composition according to claim 1, wherein alkoxyalkylsilane is trialkoxyoctylsilane.

8. The nitrile rubber-based composition according to claim 1, which is applied as a vulcanization molding material of rubber magnet for a sensor used in magnetic encoders.

9. A rubber magnet for a sensor, which is a vulcanization-molded product of the nitrile rubber-based composition according to claim 8.

10. A magnetic encoder composed of the rubber magnet for a sensor according to claim 9.

11. The magnetic encoder according to claim 10, which is used in an encoder part of a wheel speed sensor.

12. The magnetic encoder according to claim 11, wherein the encoder comprises an annular magnetic rubber molded product mounted on a support member capable of being attached to a rotating body, and single or multiple N pole and S pole are magnetized in the circumferential direction.

13. A method for producing a rubber magnet for sensor, comprising vulcanizing a nitrile rubber-based composition in a mold to which a magnetic field is applied, wherein the composition comprises 2,000 to 2,500 parts by weight of a magnetic powder or silylated magnetic powder having a compressed density of 3.4 to 3.7 $g/cm^3$, 10 to 20 parts by weight of alkoxyalkylsilane, and 30 to 40 parts by weight of a plasticizer, based on 100 parts by weight of nitrile rubber, hydrogenated nitrile rubber, or blend rubber thereof.

* * * * *